United States Patent
Kim et al.

(10) Patent No.: US 8,184,026 B2
(45) Date of Patent: May 22, 2012

(54) MOBILE INDUSTRY PROCESSOR INTERFACE

(75) Inventors: Bo Sung Kim, Hwaseong-si (KR); Seung Nam Park, Seoul (KR); Jae Il Cheon, Seoul (KR)

(73) Assignee: Dongbu HiTek Co., Ltd., Seoul (KR)

( * ) Notice: Subject to any disclaimer, the term of this patent is extended or adjusted under 35 U.S.C. 154(b) by 20 days.

(21) Appl. No.: 12/894,234

(22) Filed: Sep. 30, 2010

(65) Prior Publication Data

US 2011/0156936 A1    Jun. 30, 2011

(30) Foreign Application Priority Data

Dec. 31, 2009  (KR) .......................... 10-2009-0135294

(51) Int. Cl.
*H03M 9/00* (2006.01)
(52) U.S. Cl. ........................................ 341/100; 341/101
(58) Field of Classification Search .................. 341/100, 341/101; 361/56, 111
See application file for complete search history.

(56) References Cited

U.S. PATENT DOCUMENTS

| | | | | |
|---|---|---|---|---|
| 7,130,128 B2 * | 10/2006 | Huang et al. | ................... | 359/642 |
| 7,346,073 B2 * | 3/2008 | Haupt et al. | ................... | 370/463 |
| 7,835,314 B2 * | 11/2010 | Yee et al. | ................... | 370/310.1 |
| 7,974,051 B2 * | 7/2011 | Sato et al. | ........................ | 361/56 |
| 8,060,663 B2 * | 11/2011 | Murray et al. | .................... | 710/8 |

\* cited by examiner

*Primary Examiner* — Brian Young
(74) *Attorney, Agent, or Firm* — Sherr & Vaughn, PLLC

(57) ABSTRACT

An optimized Mobile Industry Processor Interface (MIPI) includes a transmitter physical (PHY) layer configured to convert input data into serial data and transmit the serial data in synchronization with a high-speed clock, a receiver PHY layer configured to convert the serial data into 8-bit parallel data in synchronization with the clock received from the transmitter, a bit merge block configured to merge the parallel data received from the receiver PHY layer so as to form 32-bit data using multiple lanes and to transmit the 32-bit data to a receiver protocol layer, the receiver protocol layer being configured to decode and recognize the data received from the bit merge block.

18 Claims, 7 Drawing Sheets

MOBILE INDUSTRY PROCESSOR INTERFACE

Figure 1:
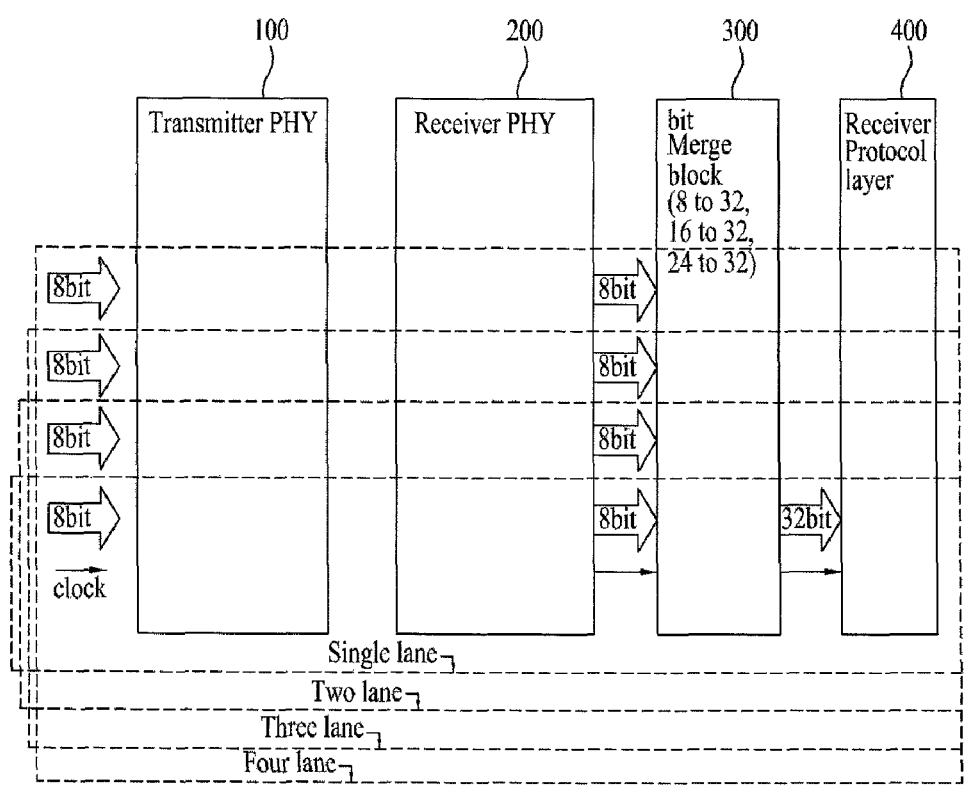

The present application claims priority under 35 U.S.C. §119 to Korean Patent Application No. 10-2009-0135294 (filed on Dec. 31, 2009), which is hereby incorporated by reference in its entirety.

BACKGROUND

A Mobile Industry Processor Interface (MIPI) refers to an interface standard of a mobile device. A so-called mobile device roughly includes hardware and software. In terms of hardware, any one of various processors or System-on-Chips (SOCs) is located at the center of the device, which is connected to a camera, a display, a memory or the like. In this processor, an application program (software) is installed.

MIPI is a new standard for hardware and software installed between the processor and a peripheral device, i.e., a new standard of a serial interface between a reference processor of a terminal and a camera module, a display, or an RF-IC, which is a peripheral processor. Numerous interfaces having similar operation performance have been recently adopted by the mobile communications industry. These interfaces are incompatible and excessive investment therein imposes a heavy burden on the mobile industry. By standardizing interfaces of the MIPI, SOCs, processors and peripheral devices provided by various manufacturers become compatible. Accordingly, it is possible to reduce development time and labor. Research into implementation of an optimized MIPI continues to be conducted.

SUMMARY

Embodiments relate to an MIPI, and more particularly, to an optimized MIPI which supports a single lane up to four lanes, such that all lanes can be implemented by one state machine.

In accordance with embodiments, an MIPI can include at least one of the following: a transmitter physical (PHY) layer configured to convert input data into serial data and transmit the serial data in synchronization with a high-speed clock, a receiver PHY layer configured to convert the serial data into 8-bit parallel data in synchronization with the clock received from the transmitter, a bit merge block configured to merge the parallel data received from the receiver PHY layer so as to form 32-bit data using multiple lanes and transmit the 32-bit data to a receiver protocol layer, the receiver protocol layer being configured to decode and recognize the data received from the bit merge block.

In accordance with embodiments, an MIPI can include at least one of the following: a transmitter physical (PHY) layer which converts input data into serial data and transmits the serial data in synchronization with a high-speed clock, a receiver PHY layer which converts the serial data into 8-bit parallel data in synchronization with the high-speed clock received from the transmitter, a bit merge block which merges parallel data received from the receiver PHY layer to form 32-bit data using a plurality of lanes; and a receiver protocol layer which receives the 32-bit data transmitted by the bit merge clock, the receiver protocol layer being configured to decode and recognize the data received from the bit merge block.

In accordance with embodiments, the bit merge block may merge four pieces of 8-bit data so as to form the 32-bit data, in a single lane. The bit merge block may merge two pieces of 8-bit data so as to form the 32-bit data, in two lanes.

The bit merge block may merge 24 bits and may not transmit the data to the receiver protocol layer in a first input, may merge 48 bits and transmit 32 bits among the 48 bits in a second input, may transmit the remaining 16 bits and 16 bits among newly input 24 bits in a third input, and may merge the remaining 8 bits and newly input 24 bits and transmit the merged 32 bits in a fourth input, in three lanes.

In four lanes, the bit merge block may transmit the input data to the receiver protocol layer without change.

In a state machine implemented by the receiver protocol layer, each state may include four bytes. The state machine implemented by the receiver protocol layer may support from a single lane up to four lanes.

The data input to the receiver protocol layer may include a short packet format and a long packet format.

In the state machine implemented by the receiver protocol layer, the state may be decided by branching the short packet format depending on which of Data ID, Byte 0, Byte 1 and ECC is input first.

In the state machine implemented by the receiver protocol layer, the state may be decided by branching the long packet format depending on which of Data ID, WC LSB, WC MSB and ECC is input first.

DRAWINGS

Example FIGS. 1-3 and 4A-4D illustrate a Mobile Industry Processor Interface (MIPI) and a state machine, in accordance with embodiments.

DESCRIPTION

Reference will now be made in detail to embodiments, examples of which are illustrated in the accompanying drawings. The configuration and operation of embodiments illustrated in the drawings and described hereinafter will be described in at least one embodiment, without limiting the spirit and scope thereof.

In addition, although the terms used in accordance with embodiments have been selected from generally known and used terms, some of the terms mentioned in the description thereof have been selected at the discretion of the applicant, the detailed meanings of which are described in relevant parts of the description herein. Furthermore, it is required that embodiments is understood, not simply by the actual terms used but by the meanings of each term lying within.

Example FIG. 1 is a block diagram illustrating a Mobile Industry Processor Interface (MIPI), in accordance with embodiments.

As illustrated in example FIG. 1, the MIPI in accordance with embodiments includes transmitter physical (PHY) layer 100 for converting input data into serial data and transmitting the serial data in synchronization with a high-speed clock, receiver PHY layer 200 for converting the serial data into 8-bit parallel data in synchronization with the input clock, bit merge block 300 for merging the input parallel data so as to form 32-bit data and transmitting the 32-bit data to a receiver protocol layer, and receiver protocol layer 400 for determining to which portion of packets the data received from the bit merge block corresponds according to its sequence, forming four complete packets including 8 bits, and decoding and recognizing necessary data in a system, to which the receiver is applied, according to the packets.

The operation of the MIPI will now be described. First, when 8-bit data is input to transmitter PHY layer 100, transmitter PHY layer 100 converts the input 8-bit data into serial data and transmits the serial data to receiver PHY layer 200 in synchronization with the high-speed clock. Subsequently, receiver PHY layer 200 converts the serial data received from transmitter PHY layer 100 into 8-bit parallel data in synchronization with the input clock and transmits the 8-bit parallel data to bit merge block 300. Bit merge block 300 merges 8-bit/16-bit/24-bit data so as to form 32-bit data and transmits the 32-bit to receiver protocol layer 400.

Figure 2:
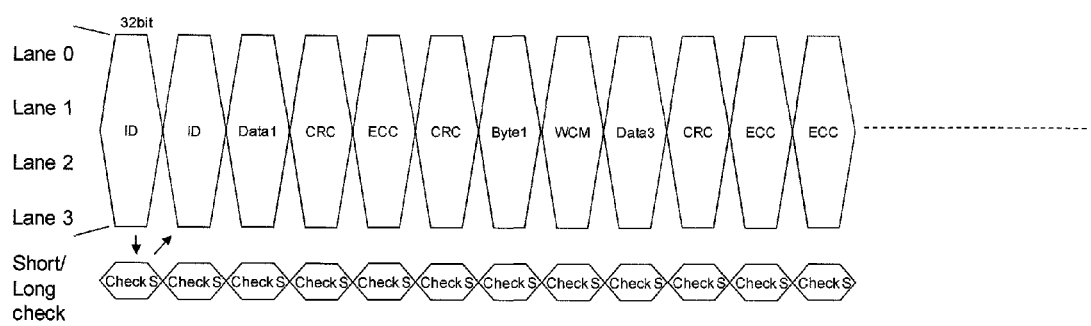

Example FIG. 2 is a block diagram illustrating data merged by bit merge block 300 of the MIPI in accordance with embodiments.

As illustrated in example FIG. 2, the operations of a single lane, two lanes, three lanes and four lanes of the MIPI in accordance with embodiments will be described. In the single lane, four pieces of 8-bit data are merged and the merged 32-bit data and the clock are transmitted to receiver protocol layer 400. In the two lanes, two pieces of 8-bit data are merged and the merged 32-bit and the clock are transmitted to receiver protocol layer 400. In the three lanes, 24 bits are input by a first input. At this time, the data is not transmitted to receiver protocol layer 400. 48 bits are merged by a second input and 32 bits among 48 bits are transmitted to receiver protocol layer 400. In a third input, the remaining 16 bits and 16 bits among newly input 24 bits are transmitted. In a fourth input, the remaining 8 bits and newly input 24 bits are merged and 32 bits are transmitted. In the four lanes, since 32 bits are received in a single input, the 32 bits are transmitted to receiver protocol layer 400.

In accordance with embodiments, if bit merge block 300 is provided to the single lane to the four lanes, a state transitions to merged data and the merged value is used as necessary data based on the transitioned state such that hardware and processing time can be reduced. In addition, only a four-lane state machine is implemented in receiver protocol layer 400 so as to correspond to four lanes.

Figure 3:
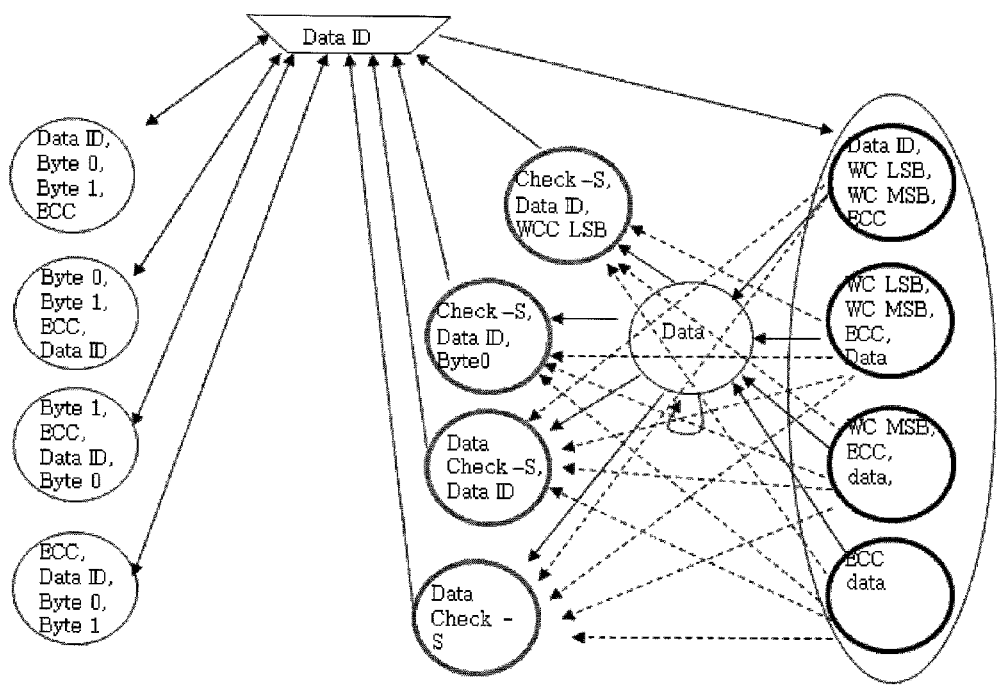

Example FIG. 3 is a diagram illustrating a 4-lane state machine according to the operation of the receiver protocol layer in accordance with embodiments.

As illustrated in example FIG. 3, the data input to the receiver protocol layer includes a short packet format and a long packet format. In accordance with embodiments, since data transmitted to receiver protocol layer 400 has 32 bits, a state machine in which four bytes exist is implemented in one state, and decoding is performed according to such a state machine. Since each state includes four bytes, four bytes may exist in one state. In the short packet, a state is decided depending on which of Data ID, Byte 0, Byte 1 and ECC is input first. In the long packet, a state is decided to be any one of the single-circle states of FIG. 3 depending upon which of Data ID, WC LSB, WC MSB and ECC is input first, and each single-circle state transitions to a data state. The single-circle state, however, may transition to a double-circle state so as to transition to a state for selecting Data ID. For example, for the state machine illustrated in example FIG. 3, if the amount of data to be transmitted in a Data ID state of the long packet of a first state of the single-circle states is 1 byte, the state directly transitions to a state, which includes Data, Check sum and Data ID, of the double-circle states (here, ECC denotes an error correction code, WC denotes a word counter, and check-s denotes check sum).

Example FIGS. 4A to 4D are diagrams illustrating operations of a state machine in accordance with embodiments.

Figure 4A:
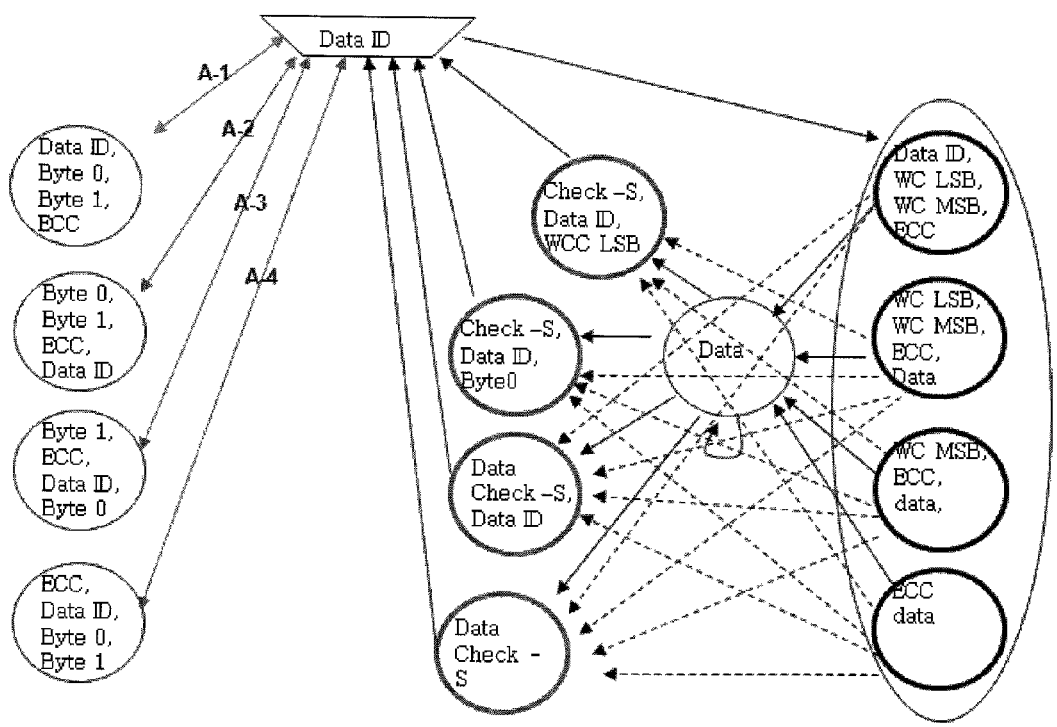

As illustrated in example FIG. 4A, A-1 to A-4 denote operations of the short packet. A-1 shows the operation of the state machine in which the ID state returns to the ID state again by the transmission of the short packet. In A-2, the packet is transmitted when a current state is Byte 0 and data decoding is finished at ECC. In A-3, the packet is transmitted when a current state is Byte 1 and data decoding is finished at ECC. In A-4, the packet is transmitted when a current state is ECC and data decoding is immediately finished. In A-1, the decoding of the packet input in the current state is performed and finished. In contrast, in A-2 to A-4, the decoding of the ID of a previous packet is performed in the current state. Similarly, the decoding of the last Data ID of A-2 is finished in a next state.

Figure 4B:
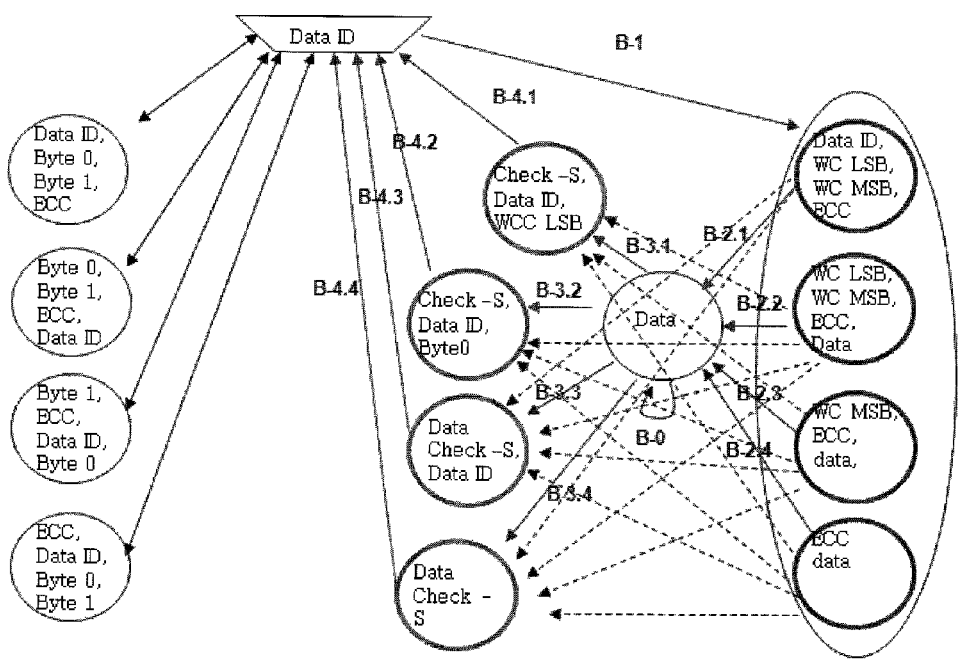

As illustrated in example FIG. 4B, B-1 shows the operation of the long packet. In B-1, a first 1 byte may become Data ID, WC (word count) LSB, WC MSB and ECC. If Data ID is received as a first 1 byte, WC LSB and WC MSB are combined such that the number of pieces of subsequently input data is confirmed in advance. The state is branched into B-2 according to the number of pieces of data so as to hold Data state. If WC LSB is received as a first 1 byte, WC LSB and following WC MSB are combined such that the number of pieces of subsequently input data is confirmed in advance, and the state branches into B-2.2. At this time, since the first byte of Data is finally input, the input data is transferred upon transition to Data state and is applied when transitioning from a next data state to B-0. If WC MSB is received as a first byte, WC MSB and WC LSB of a previous state are combined such that the number of pieces of subsequently input data is confirmed in advance, and the state is branched into B-2.3. At this time, since 2-byte data is input in advance, 2-byte data is transferred and is applied when transitioning from a next data state to B-0. If ECC is received as a first byte, WC MSB and WC LSB which are already input are combined such that the number of pieces of subsequently input data is confirmed in advance, and the state is branched into B-2.4. At this time, since 3-byte data is input in advance, 3-byte data which is input during data state transition is transferred and applied when transitioning to B-0.

Figure 4C:
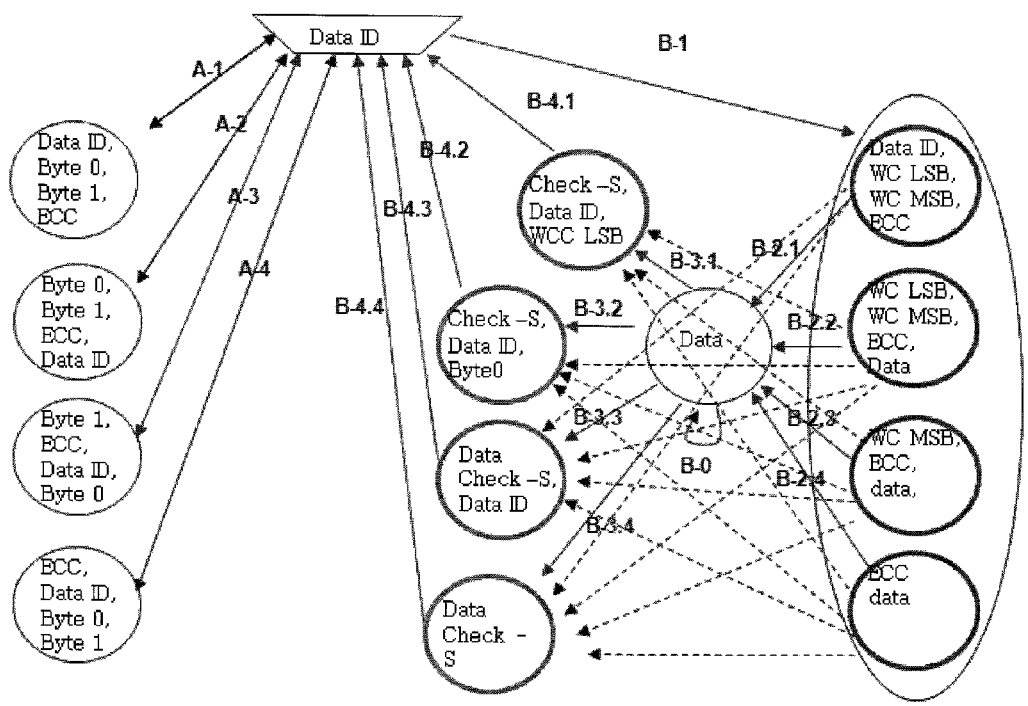

As illustrated in example FIG. 4C, in transition from data state to B-0, when 4-byte data is continuously input, the state is held in the data state and the data is processed. After transition of data of necessary pieces set by the already processed and known WC to itself is performed, the state transitions to B-3.x series. At this time, data and the WC input through B-2.x are analyzed and transition from B-3.1 to 4 is determined. In a transition determination method of B-3.x series, in the 4-byte state machine, transition to B-3.1 is performed if dividing the count of the WC by 4 yields no remainder, transition to B-3.2 is performed if the remainder is 1, transition to B-3.3 is performed if the remainder is 2, and transition to B-3.4 is performed if the remainder is 3.

If transition to B-3.1 is performed and the next packet is a long packet, the state includes Check-S (2 bytes), DATA ID and WCC LSB. The B-3.1 transitions to B-4.1 and Data ID transitions to B-1 in which WCC MSB is input first. If transition to B-3.1 is performed and the next packet is a short packet, WCC LSB is replaced with byte 0, transition to B-4.1 is performed, and Data ID state transitions to A-3 because the packet is a short packet and the next packet includes Byte 1, ECC, Data ID and Byte 0.

Figure 4D:
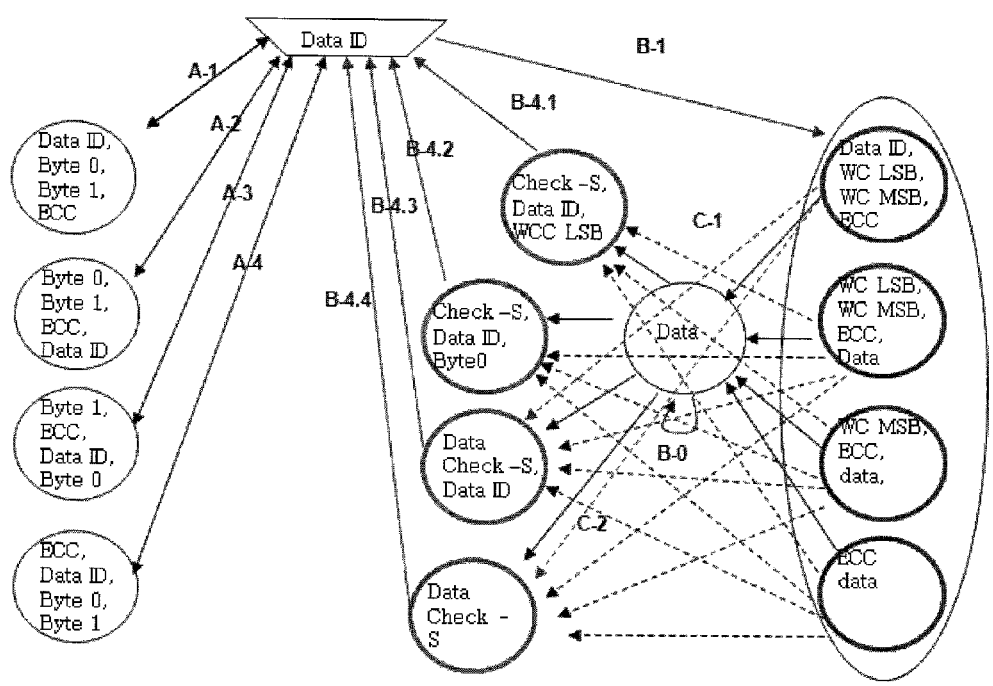

As illustrated in example FIG. 4D, in transition to B-1, when only 1-byte data including a long packet is input, transition to C-1 is performed. At this time, without transition to the data state, the packet including Data, Check-S (2 bytes) and Data ID is directly input in the next state. In transition to B-1, when only 2-byte data including a long packet is input, transition to C-2 is performed. A determination as to whether 1 byte, 2 bytes or more is input is made by information about WC. According to the determination, transition to C-1 or C-2 is performed and then transition to B-4.3 and B-4.4 is performed. Dotted-line transition is performed under the same condition as the above transition and the state transition is identical.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile industry processor interface comprising:
a transmitter physical (PHY) layer configured to convert input data into serial data and transmit the serial data in synchronization with a high-speed clock;
a receiver PHY layer configured to convert the serial data into 8-bit parallel data in synchronization with the high-speed clock received from the transmitter; and
a bit merge block configured to merge the parallel data received from the receiver PHY layer so as to form 32-bit data using multiple lanes and to transmit the 32-bit data to a receiver protocol layer, wherein the receiver protocol layer is configured to decode and recognize the data received from the bit merge block.

2. The mobile industry processor interface of claim 1, wherein the bit merge block merges four pieces of 8-bit data so as to form the 32-bit data in a single lane.

3. The mobile industry processor interface of claim 1, wherein the bit merge block merges two pieces of 8-bit data so as to form the 32-bit data in two lanes.

4. The mobile industry processor interface of claim 1, wherein the bit merge block merges 24 bits and does not transmit the data to the receiver protocol layer in a first input, merges 48 bits and transmits 32 bits among the 48 bits in a second input, transmits the remaining 16 bits and 16 bits among newly input 24 bits in a third input, and merges the remaining 8 bits and newly input 24 bits and transmits the merged 32 bits in a fourth input, in three lanes.

5. The mobile industry processor interface of claim 1, wherein, the bit merge block transmits the input data to the receiver protocol layer without change, in four lanes.

6. The mobile industry processor interface of claim 1, wherein, in a state machine implemented by the receiver protocol layer, each state includes four bytes.

7. The mobile industry processor interface of claim 1, wherein the state machine implemented by the receiver protocol layer supports from a single lane up to four lanes.

8. The mobile industry processor interface of claim 1, wherein the data input to the receiver protocol layer includes a short packet format and a long packet format.

9. The mobile industry processor interface of claim 8, wherein, in the state machine implemented by the receiver protocol layer, the state is decided by branching the short packet format depending on which of Data ID, Byte 0, Byte 1 and ECC is input first.

10. The mobile industry processor interface of claim 8, wherein, in the state machine implemented by the receiver protocol layer, the state is decided by branching the long packet format depending on which of Data ID, WC LSB, WC MSB and ECC is input first.

11. The mobile industry processor interface of claim 9, wherein the short packet format returns to Data ID again by short packet transmission if a current state is Data ID, a packet is transmitted and data decoding is finished at ECC if the current state is Byte 0, a packet is transmitted and data decoding is finished at ECC if the current state is Byte 1, and a packet is transmitted and data decoding is immediately finished if the current state is ECC.

12. The mobile industry processor interface of claim 10, wherein, in the long packet format, if Data ID is received as a first byte, WC LSB and MSB are combined such that the number of pieces of subsequently input data is confirmed in advance, and a state is branched according to the number of pieces of data so as to hold Data state.

13. The mobile industry processor interface of claim 10, wherein, in the long packet format, if WC LSB is received as a first byte, WC LSB and the following WC MSB are combined such that the number of pieces of subsequently input data is confirmed in advance, a state is branched according to the number of pieces of data, the first byte of Data is finally input, and the input data is transferred upon transition to Data state and is applied upon transition to a next data state.

14. The mobile industry processor interface of claim 10, wherein, in the long packet format, if WC MSB is received as a first byte, WC MSB and WC LSB of a previous state are combined such that the number of pieces of subsequently input data is confirmed in advance, a state is branched according to the number of pieces of data, 2-byte data is input in advance, and 2-byte data is transferred and is applied upon transition of a next data state.

15. The mobile industry processor interface of claim 10, wherein, in the long packet format, if ECC is received as a first byte, WC MSB and WC LSB which are already input are combined such that the number of pieces of subsequently input data is confirmed in advance, 3-byte data is input in advance, 3-byte data input during data transition is transferred.

16. The mobile industry processor interface of claim 10, wherein, in the long packet format, when 4-byte data is continuously input, the state is held in the data state and the data is processed.

17. The mobile industry processor interface of claim 16, wherein, after transition of data of necessary pieces set by the already processed and known WC to itself is performed, the state transitions to long packet series including Check-S, and data and WC are analyzed so as to determine transition.

18. The mobile industry processor interface of claim 17, wherein, in a 4-byte state machine, a determination is made as to whether a long packet transitions to a long packet including Check-S according to the remainder obtained by dividing the count of WC by 4.

* * * * *